US011793351B2

(12) United States Patent
Ceotto et al.

(10) Patent No.: US 11,793,351 B2
(45) Date of Patent: Oct. 24, 2023

(54) DEVICE FOR PREPARING FROTHY MILK

(71) Applicant: CMA MACCHINE PER CAFFE' S.R.L., Susegana (IT)

(72) Inventors: Beppino Ceotto, Silea (IT); Giovanni Rossetto, Conegliano (IT)

( * ) Notice: Subject to any disclaimer, the term of this patent is extended or adjusted under 35 U.S.C. 154(b) by 465 days.

(21) Appl. No.: 15/580,820

(22) PCT Filed: Jun. 24, 2016

(86) PCT No.: PCT/IB2016/053778
§ 371 (c)(1),
(2) Date: Dec. 8, 2017

(87) PCT Pub. No.: WO2016/207850
PCT Pub. Date: Dec. 29, 2016

(65) Prior Publication Data
US 2018/0160846 A1 Jun. 14, 2018

(30) Foreign Application Priority Data
Jun. 26, 2015 (IT) .................. 102015000028365

(51) Int. Cl.
*A47J 31/44* (2006.01)
*A47J 31/52* (2006.01)
*A23C 9/152* (2006.01)

(52) U.S. Cl.
CPC ......... *A47J 31/4489* (2013.01); *A23C 9/1524* (2013.01); *A47J 31/5251* (2018.08); *A47J 31/5253* (2018.08)

(58) Field of Classification Search
CPC .................................................. A47J 31/4489
See application file for complete search history.

(56) References Cited

U.S. PATENT DOCUMENTS

| 4,779,519 A | * | 10/1988 | Giuliano | ................ A47J 31/24 99/275 |
| 2013/0112083 A1 | * | 5/2013 | Douma | .................. A47J 31/44 99/294 |
| 2013/0145936 A1 | * | 6/2013 | Dollner | ............... A47J 31/4485 99/323.1 |

(Continued)

FOREIGN PATENT DOCUMENTS

| EP | 1501398 | 2/2005 |
| EP | 2534986 | 12/2012 |

(Continued)

OTHER PUBLICATIONS

International search report and written opinion dated Sep. 15, 2016 for PCT/IB2016/053778.

(Continued)

*Primary Examiner* — Nathaniel E Wiehe
*Assistant Examiner* — Elizabeth M Kerr
(74) *Attorney, Agent, or Firm* — Themis Law

(57) ABSTRACT

A frothing device (1) to froth milk, comprising a boiler (2) for producing vapor; a pump (11) for producing pressurized air; air-vapor delivering means (4) to deliver air and vapor to the milk (18); the boiler (2) and the air pump (11) are connected to a tank (6) for separately feeding vapor and air to the mixing tank (6); the tank is connected to the mentioned air-vapor delivering means (4) to deliver air and vapor to the beverage.

10 Claims, 1 Drawing Sheet

(56) References Cited

U.S. PATENT DOCUMENTS

2015/0150408 A1    6/2015   Schlee
2016/0235243 A1*   8/2016   Grassia ............... A47J 31/4489

FOREIGN PATENT DOCUMENTS

EP        2878241     6/2015
WO     03092458    11/2003

OTHER PUBLICATIONS

Priority Search Report and written opinion dated Feb. 25, 2016 for Italian application No. 102015000028365.
Office Action issued by the CN Patent Office dated May 31, 2019 for corresponding CN patent application No. 20168004715.1 and relevant reporting letter from the CN Local Agent.

* cited by examiner

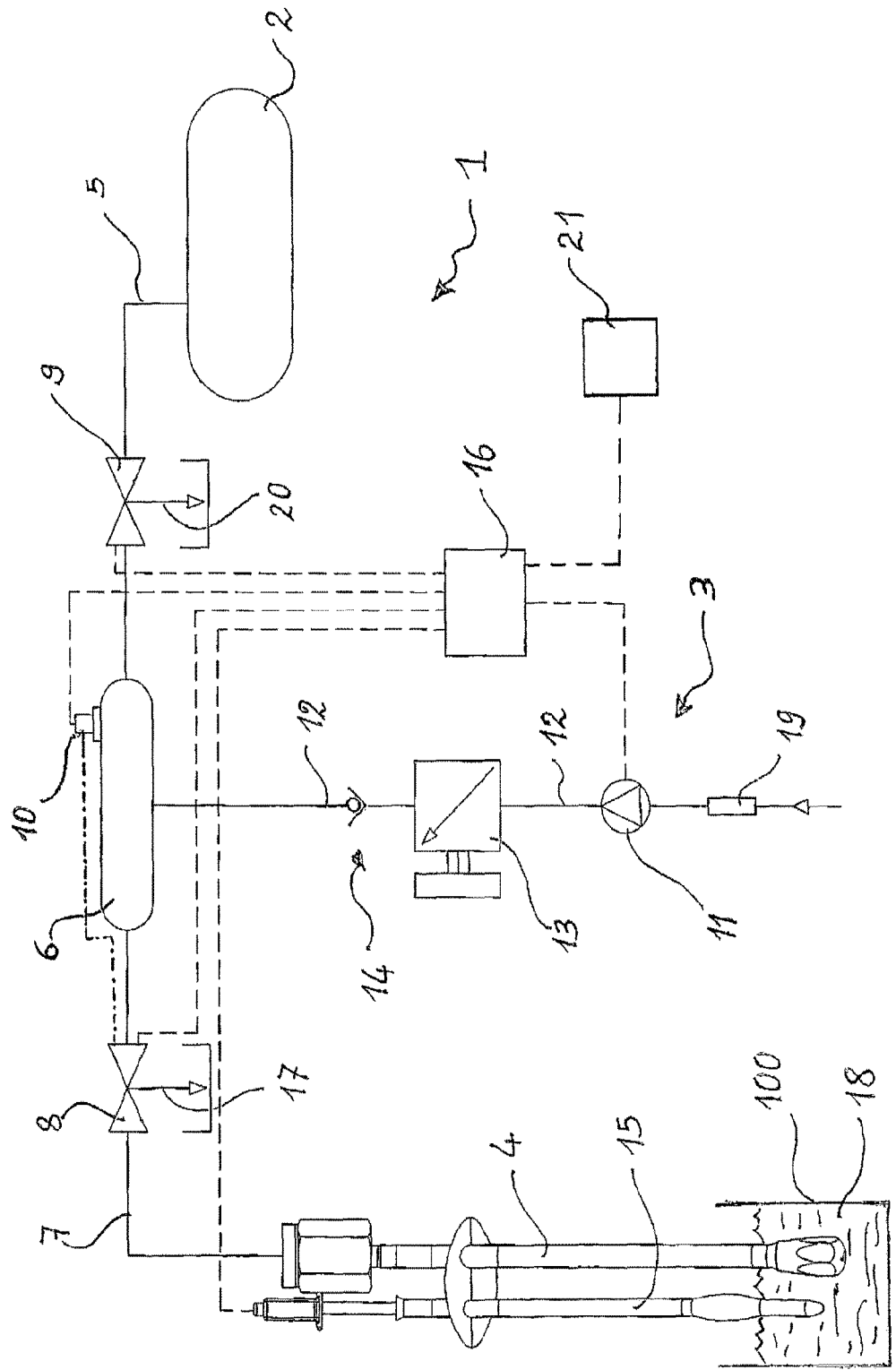

DEVICE FOR PREPARING FROTHY MILK

RELATED APPLICATIONS

This application is the US national phase application of international application number PCT/IB2016/053778, filed 24 Jun. 2016, which designates the US and claims priority to Italian application IT 102015000028365 filed 26 Jun. 2015, the contents of each of which are hereby incorporated by reference as if set forth in their entireties.

FIELD OF THE INVENTION

Description

The present invention relates to a device and method for producing frothy milk, as well as to a coffee machine comprising such a device and actuating such method. In more detail, the invention relates to a device for frothing milk when preparing beverages containing frothy milk, such as cappuccino, latte and the like.

Known Previous Art

The invention generally applies to liquid food adapted to be frothed. With frothing is meant a process in which air is incorporated into a liquid, i.e. an emulsion of air is formed in the liquid, resulting in a fine dispersion of air bubbles in the frothy liquid. Devices for frothing and heating milk are commercially known; in fact, in order to generate frothy milk, the milk is heated generally by vapor injection.

According to a known technique, milk is placed in a container, a duct delivering vapor, known as "steam wand", is immersed into the milk held in the container, thereby forming frothy milk; this method is generally used in commercial and HoReCa machines.

Furthermore, devices for frothing and heating milk, in which vapor is mixed with air in order to improve the obtained froth, are commercially known.

EP 1501398 describes a coffee machine provided with a frothing device comprising a vapor input line and an air input line entering a T-shaped manifold, the latter having a delivering line extending therefrom to deliver a mixture of air and vapor. The air input line is connected to a source of pressurized air, in this case a compressor for adjusting the air flow. The compressor has to work at a delivery pressure greater than the vapor pressure, in order to be able to properly operate. The mixture of air and vapor obtained from the collector is directly delivered into a container where the held milk is heated and frothed.

EP 2534986 describes a coffee machine provided with a frothing device in which pressurized air is fed to the service boiler, i.e. to the boiler generating vapor and heating the water needed for producing beverages. The air-vapor mixture is then conveyed to the delivering duct immersed in the milk in the respective container.

The solutions discussed above have the drawback of not providing consistent frothing results during the operation of the machine.

SUMMARY OF THE INVENTION

A frothing device to froth beverages, particularly milk, able to overcome the above described problems, is therefore needed.

Another object of the invention is to provide a device for heating and frothing milk, able to precisely adjust the frothing degree of the milk while maintaining maximum efficiency regardless of the required frothing degree of the milk.

A further object of the invention is to provide a simple device for heating and frothing milk which can be easily cleaned.

Such objects are achieved by the present invention concerning a frothing device to froth a beverage, particularly milk, comprising: vapor producing means; pressurized-air producing means; air-vapor delivering means to deliver air and vapor to the beverage; characterized in that said vapor producing means and said pressurized-air producing means are connected to a tank for respectively feeding vapor and air to said tank, and in that said tank is connected to said air-vapor delivering means to deliver air and vapor to the beverage, that is to say to means frothing the milk. Preferably, the tank is provided with a pressure sensor, this sensor being preferably a pressure transducer and/or a pressure switch.

According to further possible embodiments, however, other means to detect the pressure in the tank can be used. For example, the pressure may be detected for example by measuring the speed and/or flow rate of air and/or vapor, and/or by means of the rotation speed of the air generating pump, etc.

In particular, it should be noted that "detect the pressure" means herein a pressure measurement, for example by means of a sensor, and/or a pressure estimation based on measuring other operating parameters selected, for example, among speed, flow rate (or a combination thereof), of the air and/or vapor flow.

According to an aspect of the invention, the pressurized-air producing means comprise a pump connected to the tank through a duct, the latter being provided with at least one intercepting means to intercept the air flow, preferably a flow regulator and/or a non-return valve.

In a preferred embodiment of the invention there are a temperature sensor or other detecting means to detect the beverage temperature during frothing of the beverage. According to a further aspect of the invention, the device comprises intercepting means arranged both on connecting ducts which connect vapor producing means to the tank and on connecting ducts which connect said tank to delivering means to deliver air and vapor to the milk (or other beverage). In a preferred embodiment, the intercepting means are electrovalves, possibly three-way electrovalves; advantageously, at least the electrovalve located on the duct that connects the vapor producing boiler to the mixing tank is a three-way electrovalve provided with a drain for removing condensed water which forms when the circuit is at rest.

Preferably, device of the present invention further comprises means to intercept the air flow, arranged between the air pump and the air-vapor mixing tank; such means may comprise at least one of a flow regulator and a non-return valve, or both of them.

According to a preferred aspect of the invention, the device comprises a control unit connected to both the pressurized-air producing pump and the intercepting means, preferably electrovalves, that are on the duct feeding vapor to the tank. In an embodiment, the control unit is further connected to both the pressure sensor and the electrovalve or to other intercepting means placed on the duct that feeds air-vapor to the delivering means to deliver air and vapor to the milk or other beverage.

More specifically, in machines provided with a pressure switch, the pressure switch is set to a preset pressure value, at which a "pressure-reached" signal is generated. In an embodiment of the invention, the pressure switch is connected to the control unit (CPU) and, as the target pressure is reached, the signal thereby generated is sent to the control unit. The signal may be generated by an on-off contact, the control unit, usually a CPU, receives the signal and opens the electrovalve.

In another embodiment of the invention, the pressure switch is connected in series with respect to the electrovalve for delivering mixture to the tank; when the operating pressure of the mixing tank is reached, the pressure switch closes the on-off contact and therefore this electrovalve is electrically activated. Such electrovalve is placed on the duct connecting the mixing tank with the delivering means (also known as "wand"), to deliver vapor and air to the milk or other beverage.

According to a further aspect of the invention, at least one of said tank, said vapor intercepting means and said intercepting means to intercept the air-vapor flow, is provided with a drain for removing condensed water. Preferably such drain is in the valve placed on the duct feeding vapor to the tank.

A further object of the present invention is a machine for preparing beverages, in particular coffee-based beverages, comprising a frothing device as above mentioned. The invention further concerns a process for frothing a beverage, particularly milk, by means of an above described device, comprising the steps of:

feeding vapor and air separately to said mixing tank; detecting the pressure in said tank; activating intercepting means when a preset pressure in the mixing tank has been reached, in order to connect said tank with the mentioned air-vapor delivering means to deliver air and vapor to the beverage.

In a possible embodiment of the invention, the pressure sensor directly activates the valve delivering air and vapor to the milk. When the preset pressure P1 is reached in the tank, the contact of the pressure switch in series with the control of the electrovalve closes, thereby opening the electrovalve and allowing the tank to be connected to the above mentioned delivering means to deliver air and vapor to the beverage.

According to a preferred aspect, the preset pressure value in the tank is comprised in the range between 0.6 bar and 1.8 bars, preferably between 0.7 bar and 1.4 bars, more preferably between 1.1 and 1.2 bars. When the pressure switch or the transducer detect this value, the valve is opened (directly or through the control unit) thereby allowing the air-vapor mixture to reach the frothing means, that is to say the delivering means to deliver the air-vapor mixture to the milk or other beverage.

The tank sizes are selected based on desired bulk; preferably the tank volume is at least 120 cc, and preferably between 120 cc and 260 cc. In some embodiments, the volume of the tank is comprised between 190 and 210 cc, preferably 200 cc. It was found that, at normal operating conditions of the machine and frothing device, these volumes allow the air-vapor mixture to be at an optimum temperature.

As mentioned above, the device further comprises a milk temperature sensor, preferably placed side by side with the air-vapor delivering wand. The sensor detects the milk temperature near the delivering wand and transmits the detected data to the control unit that, once the preset temperature is reached, stops the delivery of the frothing mixture, i.e. the air-vapor mixture, to the milk. In a preferred embodiment, the delivery of air and vapor mixture to the milk through the respective means, known as wand or spray nozzle, is stopped when the milk reaches a temperature comprised in the range between 50° C. and 80° C., preferably between 55° C. and 65° C. According to a further aspect of the invention, the process provides a step of stopping the vapor delivery to the tank and keeping the air delivery; for example, it is possible to carry out such step at the end of the frothing step, in order to clean the ducts of the means delivering the air-vapor mixture. In an embodiment of the invention, only air is delivered for a limited time, usually comprised between 0.1 s and 3 s.

In a further aspect, the invention also concerns a data medium as described herein. Many advantages are provided by the invention, compared with the known art.

In fact, the air-vapor mixing is considerably improved by the tank that also allows to control the amount of the two fluids, thereby resulting in a better quality of frothed milk and a greater uniformity of minute bubbles forming the froth.

Furthermore, the mixing tank allows to operate at constant pressure; in fact, even when the vapor boiler works a lot and, therefore, its operating pressure fluctuates among pressures ranging from 0.5-0.7 to 1.2-1.4 bars, the pressure obtained in the mixing tank is always the set one. This means that, even when the boiler pressure drops, the resulting froth obtained by the device of the present invention has unchanged quality. In fact, if the vapor leaving the boiler to enter the mixing tank has temperature lower than 100° C. and pressure lower than 1 bar, then the required pressure is reached by a compensation with pressurized air, and the required milk temperature is reached by feeding the air-vapor mixture longer than in case of vapor at high temperatures.

The condensation forming inside the hydraulic circuit during the resting step can be completely removed, thereby providing a further advantage. In fact, the three-way electrovalve positioned between the boiler and the tank allows to completely drain the water forming between the mixer and the boiler.

Compared to the above discussed solution according to which air is fed directly into the boiler, the advantage of the device according to the invention is to be able to feed only vapor, if needed. In fact, usually, several vapor outlets are connected to the vapor boiler; if a frothing circuit is provided, one of the outputs is dedicated thereto, while another output can be used to heat beverages only with vapor, without frothing effects. If, as happens in the known art, air is directly injected into the vapor boiler, then only a mix of vapor and air can be obtained from the boiler, so that it will be not possible to heat the milk without frothing it, or even to heat another beverage without frothing the latter.

BRIEF DESCRIPTION OF THE DRAWINGS

These and other advantages will be evident from the following description made with reference to the FIGURE included for illustrative purposes and without limitation, where:

FIG. 1 is a scheme of a device according to the present invention.

DETAILED DESCRIPTION OF PREFERRED EMBODIMENTS OF THE PRESENT INVENTION

Referring to FIG. 1, the frothing device 1 to froth a beverage, particularly milk, comprises vapor producing means, for example a boiler 2, and pressurized-air producing means 3, in the shown embodiment these means include a pump 11 and, preferably, also a gicleur 19 upstream of the pump.

The boiler 2 is connected to a tank 6 by a duct 5 having vapor intercepting means arranged thereon, in the embodiment shown the intercepting means are a three-way electrovalve 9. The valve 9 is preferably provided with a draining way 20 to drain the water formed by vapor condensation when the device is at rest.

The pressurized-air producing means 3, i.e. the pump 11, are connected with the tank 6 through a duct 12; on the duct 12 there can be intercepting means. In an embodiment of the invention, the intercepting means comprise a flow regulator 13 for controlling the air flow rate to the tank. In order to prevent the vapor from flowing along the duct 12 towards the pump 11, there can be a non-return valve 14.

As shown in FIG. 1, the invention provides for air and vapor being separately fed to the tank 6; in this way, the composition of the air-vapor mixture in the tank 6 and, accordingly, the composition of the air-vapor mixture delivered to the milk 18 to be frothed in the container 100, can be both adjusted. The tank 6 is connected through a duct 7 to the delivering means 4 to deliver the air-vapor mixture to the milk 18 (or other beverage) held in the container 100. The delivering means, also known as "steam wand", are known per se in the art and comprise a duct provided with a spray nozzle at the end thereof; as shown, the end is immersed into the milk 18 held in the container 100.

As known, in the coffee machine according to the shown embodiment, the frothed milk is at least partially removed from the container 100 in order to be fed to the user's cup; however, the invention is not limited to the shown application and any type of delivering means can deliver the mixture obtained in the tank 6. For example, the vapor-air mixture can be fed to frothing means comprising a frothing chamber (not shown) which is part of the beverage production machine. An example of a frothing chamber is described in Patent EP 2534986 with reference to FIGS. 4 and 5.

On the duct 7 there are intercepting means to intercept the air-vapor flow, for example a valve 8, preferably a three-way electrovalve. The valve 8 is preferably provided with a draining way 17 acting so as to drain the water formed by vapor condensation when the device is at rest.

The tank 6 is preferably provided with at least one pressure sensor 10. The pressure sensor 10 can be a pressure transducer or a pressure switch. According to an embodiment, in both cases, the sensor generates a signal that is sent to a control unit 16, generally a CPU, in order to control the operation of the device 1. The pressure switch can instead be electrically connected, in series, to the electrovalve 8, preferably by means of the on-off contact of the pressure switch; in this solution, the electrovalve is actuated by the pressure switch directly.

The device 1 preferably comprises also a sensor 15 detecting the temperature of the milk 18 (or other beverage) during the frothing step thereof. A corresponding signal is generated and sent to the control unit 16, in a known way. This type of temperature sensors are known, commercially available and used on some models of coffee machines.

The control unit 16 is preferably connected at least to the valve 9 and the air pump 11; in the shown embodiment, the control unit, or CPU, 16 is also connected to the valve 8 controlling the feeding of the vapor-air mixture from the tank 6 to the frothing means 4, to the pressure sensor 10 and to the temperature sensor 15 of the beverage.

The control unit can be also connected with the flow regulator 13 in order to set the latter at a desired value depending on the beverage to be obtained.

The process according to the invention provides for separately feeding air and vapor to the mixing tank 6 in order to obtain therein an air-vapor mixture; at the same time, the sensor 10 detects the pressure inside the tank 6 and a corresponding signal is sent either to the control unit 16 or the valve 8.

If the pressure has reached the desired value, the CPU 16 can operate the intercepting means 8, i.e. open the valve 8, to connect the tank 6 with the delivering means 4 to deliver air and vapor to the milk 18 in the container 100. Alternatively, as seen, the on-off contact of the pressure switch can be connected to the valve 8 in order to control the opening or closing thereof.

In FIG. 1 the line connecting the pressure switch 10 and the valve 8 is referred to with the numeral 22; in a possible embodiment, this line is preferably present in place of the pressure switch 10-CPU 16-valve 8 connection.

If the sensor 10 is a transducer, the pressure value signal generated by the transducer is compared with a pressure value stored in the control unit 16; the latter actuates the valve 8 when the pressure value is within a suitable range of pressure values. As seen, in an embodiment, the sensor 10 can be a pressure switch sending an on-off signal when a suitable and preset pressure value is reached. As a result, the CPU 16 can actuate the valve 8.

Preferably, the preset pressure value is comprised in the range between 0.6 bar and 1.8 bars, preferably between 0.7 bar and 1.4 bars, more preferably is about 1.1-1.2 bars.

Then, the control unit stops the air-vapor delivery on cue, or after a preset time or else when a preset temperature is reached. As mentioned above, in an embodiment, even after finishing the vapor feed, the air pump 11 can continue to feed air. In another embodiment of the invention, air is delivered in a step other than the frothing one, when the delivering means have already been pulled out of milk, in order to clean the ducts of the delivering means, by removing therefrom any milk (or beverage) and any condensation.

In a preferred embodiment, the operator interface 21, connected to the CPU, comprises a cycle start button and, by pressing the same, the CPU 16 activates both the vapor electrovalve 9 and the air pump 11, preferably at the same time; when the pressure inside the mixing tank 6 reaches the planned pressure P1, or when the pressure switch gives an on-off signal of reaching a pressure P1, the control unit 16 operates the opening of the valve 8, which allows the flow of mixed air and vapor to reach the delivering means 4, the end of which is immersed in the container 100 of the milk 18. As a result, the milk frothing is obtained.

In a further preferred embodiment, by pressing the cycle start button on the operator interface 21, the CPU 16 activates both the vapor electrovalve 9 and the air pump 11, preferably at the same time.

The electrovalve 8 is not activated via the CPU, because the contact of the pressure switch 10 is arrange in series to the control of the electrovalve 8; when the pressure inside the mixing tank 6 reaches the planned pressure P1, the pressure switch provides a pressure-reached on-off signal thereby activating the opening of valve 8 and allowing the flow of mixed air and vapor to reach the delivering means 4, the end of which is immersed in the container 100 of the milk 18, in order to froth milk.

Henceforth the milk heating and frothing step takes place. Beside the steam wand, the temperature probe, with a transducer connected to CPU, detects the milk temperature;

when the planned temperature is reached, comprised in the range between 50° C. and 80° C., preferably between 55° C. and 65° C., the CPU 16 closes the valve 9 and the electrovalve 8. In other words, generally the feed of air and vapor are dependent from each other. In an embodiment, the control unit, CPU, in order to allow cleaning of the hydraulic circuit from the mixing tank 6 to the delivering means 4 at the end of the cycle, may keep the air pump active and the electrovalve 8 open for a few seconds.

It should be noted that, although in the foregoing description reference has been made to an exemplary embodiment, the invention can be implemented according to a high number of variations. In fact, the described embodiment is merely illustrative and should not be intended in any way to limit the protection scope, the configuration or application of the invention. On the contrary, the above description should be considered as a guide for implementing at least one embodiment of the invention; a number of modifications to those described may be made to the exemplary embodiment, without departing from the protection scope of the invention.

The invention claimed is:

1. Frothing device to froth a beverage, comprising:
   vapor producing means for producing vapor;
   pressurized-air producing means for producing pressurized air; and
   air-vapor delivering means for delivering an air-vapor mixture to the beverage,
   wherein said vapor producing means and said pressurized-air producing means are separately connected to a tank for respectively feeding said vapor and said air to said tank to deliver said air and said vapor to the beverage, and wherein said tank is provided with a pressure sensor, and
   air-vapor intercepting means for intercepting said air-vapor mixture from said tank, said air-vapor intercepting means being activated when said pressure sensor measures a preset pressure in the tank to connect said tank with said air-vapor delivering means to deliver said air-vapor mixture,
   said vapor producing means being connected to said tank by a first connecting duct and said pressurized-air producing means being connected to said tank by a second connecting duct, said first and second connecting ducts being provided with separate intercepting devices in order to adjust a composition of the air-vapor mixture inside the tank.

2. The frothing device according to claim 1, wherein said pressure sensor comprises a pressure transducer or a pressure switch or a combination thereof.

3. The frothing device according to claim 1, wherein volume of the tank is at least 120 cc and no greater than 250 cc.

4. The frothing device according to claim 1, wherein said pressurized-air producing means includes a pump connected to said tank through the second connecting duct, wherein said intercepting device of said second connecting duct comprises comprising a flow regulator or a non-return valve or a combination thereof.

5. The frothing device according to claim 4, further comprising a temperature sensor for detecting beverage temperature during frothing of the beverage and a control unit connected with said intercepting device of said first connecting duct, said pump, and said temperature sensor.

6. The frothing device according to claim 5, wherein said control unit is connected with said pressure sensor.

7. The frothing device according to claim 1, further comprising a temperature sensor for detecting beverage temperature during frothing of the beverage.

8. The frothing device according to claim 1, further comprising:
   a further connecting duct connecting said tank to said air-vapor delivering means, wherein said air-vapor intercepting devices means is arranged on said further connecting duct.

9. The frothing device according to claim 1, wherein said pressure sensor is connected in series with the air-vapor intercepting means for intercepting said air-vapor mixture in order to activate said air-vapor intercepting means.

10. The frothing device according to claim 1, further comprising a drain for condensed water, said drain being coupled to at least one of said tank, said intercepting device of said first connection duct, and the air-vapor intercepting means.

* * * * *